United States Patent [19]
Morgan

[11] 4,139,234
[45] Feb. 13, 1979

[54] WINDOW ASSEMBLY

[75] Inventor: Cleon Morgan, Holland, Mich.

[73] Assignee: Donnelly Mirrors, Inc., Holland, Mich.

[21] Appl. No.: 864,487

[22] Filed: Dec. 27, 1977

Related U.S. Application Data

[63] Continuation-in-part of Ser. No. 724,618, Sep. 20, 1976, Pat. No. 4,072,340.

[51] Int. Cl.² .............................................. B60J 1/02
[52] U.S. Cl. .................................... 296/84 R; 52/208; 160/371
[58] Field of Search ................ 296/84 R, 84 A, 84 D, 296/93, 146; 49/DIG. 2; 160/371; 20/40, 56.5, 56.4; 29/428; 52/400, 624

[56] References Cited
U.S. PATENT DOCUMENTS

| | | | |
|---|---|---|---|
| 1,911,578 | 5/1933 | Masters | 296/84 R |
| 2,258,724 | 10/1941 | Wagner et al. | 20/40 |
| 2,966,435 | 12/1960 | Kassinger | 154/2.71 |
| 3,776,591 | 12/1973 | Krueger | 296/146 R |
| 4,007,536 | 2/1977 | Soderberg et al. | 29/421 |

*Primary Examiner*—Richard A. Bertsch
*Attorney, Agent, or Firm*—Price, Heneveld, Huizenga & Cooper

[57] ABSTRACT

A vehicular assembly formed as a complete unit prior to installation and adapted to be installed as a unit from the exterior of the vehicle body with only final securement of attachment means being necessary from the interior of the vehicle body. The assembly includes a molded plastic casing or gasket, a transparent window around which the casing or gasket is molded, and an attachment member. The attachment member may be a continuous rigid frame concealed from view from the outside of the assembly having a portion embedded within the casing and a portion extending from the casing by which the entire assembly is secured to the vehicle body. Alternately, separate attaching members are embedded within the casing. Decorative strips may be secured to the casing exterior. The casing may be molded around only one edge of the window thereby forming a flexible, resilient hinge allowing the window to be moved between open and closed positions. The hinged version may be used when the attachment member is either an external frame, a continuous rigid frame embedded within the casing, or individual members embedded within the casing.

34 Claims, 35 Drawing Figures

WINDOW ASSEMBLY

CROSS-REFERENCE TO RELATED APPLICATION

This application is a continuation-in-part of Ser. No. 724,618 filed Sept. 20, 1976, now U.S. Pat. No. 4,072,340.

BACKGROUND OF THE INVENTION

This invention relates to window assemblies and, more particularly, to a window assembly including a frame, a window, and a gasket or casing for holding the frame and window together. The window assembly is especially useful in vehicles and is installed from the exterior of the vehicle as a complete unit.

The installation of windows, especially in vehicles, has taken many forms. A common example is the positioning of a window pane or sheet of glass against a bead of sealant applied around the periphery of an aperture in a window frame and thereafter framing in or securing the rear side of the glass to the frame. This is typically done in building structures or in window units for such structures. In window assemblies for vehicles, however, and especially those windows which are not designed to be raised and lowered but rather are permanently positioned such as in the rear quarter panel of an automobile, installation of such permanent windows has often been time consuming, complicated and thus quite expensive.

In one method, a bead of sealant was applied to the periphery of the window frame from the interior of the auto with a sheet of glass pressed against that sealant, a backup frame applied around the rear of the glass and sealant and a plurality of clips or other securing fasteners applied to hold the backup frame in position. Either before or after all of the above, a finished metallic or other frame had to be applied from the exterior of the car to hide the raw, unfinished edges around the window aperture. Such piecemeal assembly steps have also been used in other permanently mounted vehicle windows such as the windshield or rear window except that the installation occurs from the exterior in the above-mentioned piecemeal fashion.

Another method for attaching permanent windows in automobiles and other vehicles was the prior securement of a window pane or sheet of glass to a metallic frame by means of a rubber or other similar collar which extends over both sides of the edge of the window aperture in the metal frame and also extends around the periphery of the glass to hold the frame and glass together. This frame and glass was then applied from the interior of the automobile to an aperture in the vehicular body while being secured and sealed in place. Again, however, a finishing bezel or frame had to be applied from the exterior of the body to conceal from the exterior the material holding the interior frame and window together. This method could thus not be used to secure a window directly from a vehicle exterior because the extension of the rubber or other collar over both sides of the window frame left an unsightly external ridge necessitating cover up with additional material.

None of the above methods, therefore, provided a simple, easily installed, completely finished window assembly which could be located virtually entirely from the exterior of the vehicle in order to save time and expense.

Another problem in the installation of windows, especially in modern vehicles, is the difference in curvature between the window itself and the frame to which it is to be secured. Since the glass in many current automobiles is typically curved or bent and tempered, and such bending is usually less precise than the stamping or bending of the frame to which it is to be secured or attached, differences in curvatures often exist. Any attachment of a window to a frame to provide a window assembly ready for installation would have to overcome and accommodate the problem of such differing curvatures as well as the stress resulting from the window tending to return to its own shape or curvature should the window be secured in the shape or curvature of the frame.

In many applications, the overall weight and cost of the window assembly is important in reducing the weight and cost of the entire vehicle. Therefore, the provision of a single unit which can be applied easily from the exterior of a vehicle in a time and labor-serving manner was desirable from a cost standpoint while the reduction in number of parts, finishing strips and thus overall weight of the window structure was also desirable.

Other problems encountered with prior known window structures and assemblies resulted from an inability to easily modify or vary the decorative trim on the exterior of the vehicle around a window opening. Generally, such trim was a metallic strip which, of necessity, had to be applied separately and attached by clips or other fasteners around the window opening to cover the sealant and window edge when the window was applied from the interior as described above.

Further, no previous structure was available allowing installation of a window and frame as a unit from the exterior of a vehicle while also providing the ability to open at least a portion of the window when desired after installation. Previous structures and methods required complex crank mechanisms for raising and lowering windows or separate hinge mechanisms secured to window panes and individually placed in vehicular window openings apart from the frame which surrounded the opening.

SUMMARY OF THE INVENTION

Accordingly, the present invention provides a finished, completed window assembly which is ready for installation virtually entirely from the exterior of a vehicle or other supporting body in a manner which has heretofore been unknown. The window assembly combines a frame, typically of metal or plastic which is preshaped and finished to be ready for application to the exterior of a vehicle or other support, a transparent window, typically a curved or planar glass sheet, and flexible, resilient gasket or casing which holds the window to the preformed frame. The assembly includes apparatus for attaching the unit in its entirety from the exterior of the auto or one side of a support in its permanently located position. The attaching apparatus is concealed from view after attachment and only final securement of this apparatus is necessary from the interior of the vehicle or the opposite side of a support. The invention, therefore, eliminates the need for piecemeal assembly of the various window unit elements from either the interior or exterior of the vehicle.

In one form, the window assembly comprises a casing constructed of a molded plastic material approximating the shape and size of an opening in a vehicle body. The casing is molded around the peripheral edge of a transparent window. The casing is also molded around at least a first portion of an attachment means for attaching the casing to the vehicle body. The first portion is embedded within the casing while the casing includes an inner surface arranged to face in a direction toward the inside of the vehicle body and an outer surface arranged to face in a direction toward the outside of the vehicle body. The attachment means has second portions spaced along the casing, extending in a direction toward the inside of the vehicle body, and constituting affixing means for fixing the composite casing and transparent window over the opening in the vehicle body. The casing and attachment structure provide a finished trim around the window and the periphery of the opening in the vehicle body while the second, affixing portions of the attachment means are concealed from view outside the vehicle body.

The window assembly of the present invention also overcomes the above-described problem of differences in curvature between the curved glass or window and frame. Retaining projection means are included on the window frame extending at least partially into the gasket or casing from one side of the frame for holding the gasket and window to the frame. These retaining projection means interact with the flexible, resilient gasket to accommodate any deviations in contour or curvature which cause stress between the frame and window without allowing the window to pull away from the frame. In the preferred embodiment, the retaining means are projections which extend into the gasket which is injection molded from polyvinyl chloride around the periphery of the window, in a space intermediate the window and the edge of the window aperture in the frame, and around the projections. The projections also include apertures or other surface irregularities which are filled in by the molded material. After molding, when the window tends to return to its original and often differing curvature from the frame, the resiliency of the gasket material and its secure retention to the projections, allows the gasket to yield but prevents separation of the window and frame.

The invention also provides secure sealing between the gasket and the frame as well as between the frame and its ultimate support such as a vehicle body. The concealed attaching structure for securing the assembly to the support or vehicle body preferably extends to the same side of the frame as do the retaining projections for the gasket and window.

In other aspects of the invention, a light weight window assembly is provided wherein the transparent window itself provides the principal support for the assembly which includes a rigid frame extending along the entire length of the casing and concealed from view from the outside of the vehicle body. The frame includes at least one flange extending therealong which is embedded within the casing while the frame provides strength and support for the casing. Although the window provides the main support, the casing and attachment member combination provides the ability for securing the assembly to the vehicle body as well as decoration around the window opening in the vehicle body.

In another embodiment, the apparatus for attaching the assembly includes a plurality of rigid, separate attaching members embedded within the casing at spaced locations and concealed from view from the outside of the vehicle body. Each of these attachment members includes a stud projection extending out of the casing toward the inside of the vehicle body for attaching the assembly to the vehicle.

In yet another embodiment of the invention, one portion of the casing is molded around a peripheral edge portion of the window to form a flexible, resilient hinge allowing the window to be pivoted between closed and open positions. The casing has other portions which tightly, sealingly engage the remainder of the peripheral window edge when the window is closed. In this embodiment, the frame or attaching members provide support for the casing when the window is pivoted out of the casing.

The above embodiments also enable flexibility in decorating the exterior of the window assembly by allowing the securement of metal strips or a thin layer having a coating of metal thereon. The present window assembly, therefore, provides a versatile assembly which can be modified to meet weight, cost and decorative requirements for various vehicles as well as providing permanently positioned windows or windows which can be pivoted open.

These and other objects, advantages, purposes and features of the invention will become more apparent from a study of the following description taken in conjunction with the drawings.

DESCRIPTION OF THE PREFERRED EMBODIMENT

Figures 1, 2, 3, 4, 5, 6, 7:
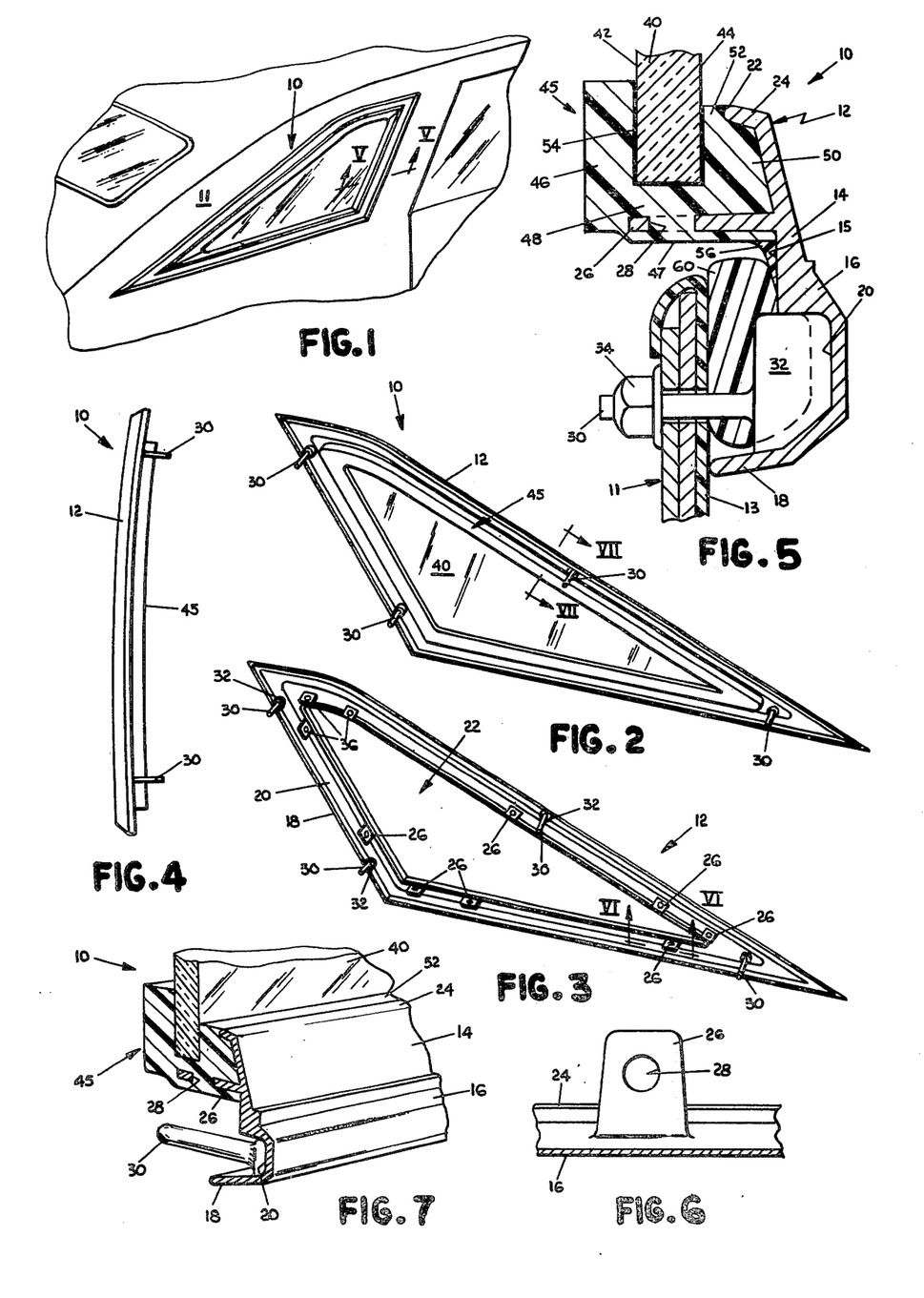
FIG. 1 is a fragmentary, perspective view of the rear quarter of an automobile illustrating one form of the window assembly of the present invention secured thereon.
FIG. 2 is a perspective view of the back or inner side of the window assembly of FIG. 1, the back side being concealed from view after installation.
FIG. 3 is a perspective view of the back or inner side of the window frame portion of the window assembly of FIG. 1.
FIG. 4 is an end view of the window assembly shown in FIGS. 1 and 2.
FIG. 5 is a sectional view taken along line V—V of FIG. 1 showing the arrangement of the frame, window element and gasket as well as the attachment and sealing of the window unit to the vehicle body.
FIG. 6 is a fragmentary, side elevation, shown partially in cross section, of one of the retaining projections formed on the window frame and taken along line VI—VI of FIG. 3.
FIG. 7 is a fragmentary, perspective view taken along line VII—VII of FIG. 2 and shown partially in cross section of a portion of the window assembly showing the attachment of the window to the frame by means of the gasket and retaining structure.

Referring now to the drawings in greater detail, FIG. 1 illustrates the window assembly 10 of the present invention secured to the rear, roof support post portion 11 of an automobile above the rear quarter panel area. The window unit assembly 10 is designed for permanent installation to provide a window which cannot be raised or lowered. As mentioned above, the assembly provides an improvement over the prior known piecemeal assembly methods used for installation of permanently positioned windows in vehicles and other structures and allows installation of the window assembly as a unit from the exterior of the automobile with only final securement of a few nuts or other securing means being necessary from the interior to complete the installation.

As shown in FIGS. 2–5, the window assembly 10 includes a window attachment frame bezel 12 having a peripheral outline or configuration designed to match the contour of the ultimate support or vehicle body to which it will be attached. As shown in FIG. 5, frame 12 includes a generally rectilinear or straight central section 14 which protrudes outwardly as well as a channel-like section 16 toward the outer periphery of the frame. Channel portion 16 extends laterally inwardly and ends in a lower lip 18 which contacts the vehicle body or support at the outermost periphery of the frame. Channel 16 also forms an interior chamber or channel area 20 which receives a sealing bead 60 as will be explained more fully hereinafter. The inner periphery of the frame which defines the window aperture 22 ends in a laterally inwardly extending lip 24. Lip 24 extends laterally toward the side of the frame 12 on which the window glass 40 and retaining gasket 45 are secured. At spaced intervals around the entire continuous frame 12, on the laterally inner side of the frame to which the glass window is secured, are integrally formed in one piece with the frame a plurality of tabs or retaining projections 26 which cooperate with the resilient, flexible gasket material as will be explained more fully hereinafter. Each tab or retaining projection 26 is generally square or rectangular and extends generally perpendicularly to the general plane of the entire frame and generally parallel to the peripheral edge of window 40. Each projection includes a circular aperture 28 extending completely therethrough forming an irregular surface extending transversely of the projection and the side surfaces of the window. Apertures 28 are filled during the assembly of the window unit by the moldable gasket material so as to retain the gasket to the frame.

Also included on the frame 12 are a plurality of cylindrical securing studs 30 extending generally perpendicularly or normal to the general plane of the frame toward the inner side of the frame to which the glass is secured as do tabs or projections 26. Studs 30 are formed integrally in one piece with platform areas 32 which in turn and formed integrally in one piece with the frame in the channel area 20 at spaced intervals on the interior side of channel portion 16. Studs 30 receive stamped sheet metal jamb or grip nuts 34 on the inside of a support such as a vehicle body 11 as shown in FIGS. 1 and 5 to secure the entire assembly 10 to the vehicle.

The second major portion of the assembly is the sheet or pane of transparent window glass 40 which is retained to the inner side of the frame 12 by a tough, flexible, resilient gasket 45 which extends continuously about the entire inner periphery of frame 12 and is preferably formed from molded polyvinyl chloride. Window 40 is typically a sheet or tempered glass curved to the contour of frame 12 (FIG. 4) although other transparent sheet materials such as plastic could be used.

Gasket or molded casing 45 forms a tough, yet yieldable adhering member between the frame and glass. The gasket or casing is injection molded around the entire peripheral edge of the window 40 as well as each of the projections 26 such that the gasket material flows through, entirely fills, and tightly engages both the projection and the apertures 28 therein. As shown in FIG. 5, the gasket 45 includes a ridge or shoulder 46 abutting and extending inwardly of the window periphery along rear surface 42 of the window opposite the side on which frame 12 is located, a base area 48 which extends generally parallel to the peripheral edge surface of the window 40 and encompasses the projections 26, and a frame portion 50 extending between the front surface 44 of window 40 and frame 12 including central portion 14 and inner lip 24. Frame portion 50 ends in a reduced thickness gasket portion 52 which extends between the end of inner lip 24 and glass surface 44 and forms a flush, continuous surface with the outer surface of the lip 24. During assembly, frame 12 and glass 40 are held and positioned within a mold while the moldable material from which gasket or casing 45 is made, preferably polyvinyl chloride, is flowed into the mold around the peripheral edge of the glass 40 and inside frame 12 on one side thereof as shown in FIG. 5 as well as around and through projections 26. Projections 26 are covered by the gasket and preferably do not extend therefrom. As the polyvinyl chloride or other moldable material cools, hardens and sets up, it becomes a tough, resilient, flexible and yieldable mass extending continuously around the inside of the frame for holding the glass in position as shown in the figures. Any need for additional securing members such as screws, rivits or the like to hold the window, gasket or casing and frame together is eliminated.

As shown in FIG. 4, window assemblies 10 typically include some curvature in accordance with the design of modern automobiles. Glass 40 is typically a cylindrically bent, tempered glass sheet contoured to the shape of the curved frame bezel 12. Often, however, a small variation tolerance occurs between the curvature or contour of the frame bezel and glass because the tempered, cylindrically pressed glass cannot be bent to an exact curvature as can the frame bezel which is typically made from plastic or metal. Accordingly, even though the glass is forced into the contour or shape of the bezel by the mold during the process of flowing the moldable material around the two parts to form gasket 45, glass 40 will return to its original bent shape varying from the curvature of the frame bezel after the mold pressure is released and the gasket has set up and become tough, flexible and resilient. However, the combination of the retaining projections 26 including apertures 28 and the resiliency and yieldability of the gasket material combines to accommodate any stress placed on the gasket by the glass returning to its original configuration. Except for large or gross differences in curvature, gasket 45 is prevented from pulling away from the frame bezel by projections 26 with apertures 28 filled by the gasket material and proper retention and sealing between the glass and frame bezel is maintained.

In order to ensure proper retention of the glass 40 in the gasket 45, the peripheral edge and surfaces 42, 44 of glass 40 adjacent that edge are coated prior to molding of the gasket therearound with a primer layer or coating 54 of a heat activatable, resinous material which promotes and facilitates the adhesion of the gasket material to the glass 40. A preferred primer material is a combination material obtained from the B. F. Goodrich Chemical Company under Product Nos. A-1100-B and A-1167-B. The primer includes 98% of composition A-1100-B and 2% of composition A-1167-B. The primer layer 54 ensures proper bonding and adhesion of the gasket to the glass 40.

To assure the proper weatherproofing and sealing of the joint between the frame 12 and gasket 45 along the inner surface of central portion 14, an additional bead of sealant material 56 is located and secured in the corner between the outer peripheral surface 47 of gasket 45 and the inner surface 15 of central portion 14 of frame 12. This sealing bead 56 which is curved across the corner continously around the entire frame-gasket combination is preferably formed from a pumpable, flowable, self-adherent, tacky, sealer composition such as that made by the 3M Company, Inc. under Product No. EC 1792. Sealing bead 56 prevents leakage of water, dust or other contaminants between gasket 45 and the inner surface of frame 12 even when glass 40 returns to a contour which may vary from that of the frame and which may cause gasket 45 to yield somewhat to the stress imposed by such variance. Sealant 56 remains flexible and self-adherent throughout its life so as to retain its sealing qualities.

Alternately, a vinyl laminating adhesive such as Daubond (Trademark) DC-8660 produced by Daubert Chemical Company of Oakbrook, Illinois may be used instead of sealant 56 and applied to the die cast bezel inner surface to adhere and seal the gasket directly to the bezel or frame during molding.

When completed as shown in FIGS. 2, 4, 5 and 7, window assembly 10 is ready for installation on its support such as a vehicle body or roof support post 11. The assembly is installed directly from the exterior of the body since the frame 12 itself is finished prior to assembly with the glass and gasket such as by chrome plating, painting a combination of the two of the like. To install the finished unit, a large bead 60 of butyl sealer of the type produced by Tremco, Inc. under Product No. 75268A is applied along the interior surface of channel 16 in area 20 of frame 12 around the entire frame. This sealer remains tacky and pliable throughout its life to maintain its sealing properties. If desired, sealant bead 60 could be applied to frame 12 immediately after manufacture of assembly 10. Assembly 10, with the butyl sealer thereon, is pushed against the body with its inner or glass side facing the body or support such that studs 30 extend into holes or apertures previously provided in corresponding places in the body. The sealer 60 conforms to the shape of the channel portion 20 and firmly adheres to the body 11 which may include a sheet of vinyl roof covering material 13 between the window unit and the body of sheet metal. Thereafter, all that remains to be done is the application of a jamb or grip nut 34 on each stud 30 against the inside surface of the body 11 so that the entire frame is pulled tightly against the outer surface of body 11 with outer peripheral lip 18 being in tight contact therewith. No additional external molding, sealing or finishing strips or elements need be applied to the window since the assembly is complete from the exterior after the above installation. The installation process is, therefore, virtually entirely performed from the exterior of the car, saving time and expense in the assembly operation. Proper sealing is obtained with the gasket 45 and butyl sealant beads 56 and 60 entrapped between the body and frame 12 and concealed from view thereby. In addition, securing studs 30 are also concealed from view behind the exterior surface of the frame. The entire unit provides a neat, finished, high quality appearance from the exterior of the vehicle after installation. The troublesome and time-consuming piecemeal assembly operations previously used to install permanent windows of this type are, therefore, completely eliminated.

Alternately, other forms of attachment or securing means may be substituted for studs 30. Such means might include bendable clips secured to the inner surface of the frame and bent over the edge of the body portion 11 or the like. However, even in this case, they will remain concealed from the exterior of the unit when installed.

Figures 8, 9, 10, 11, 13:
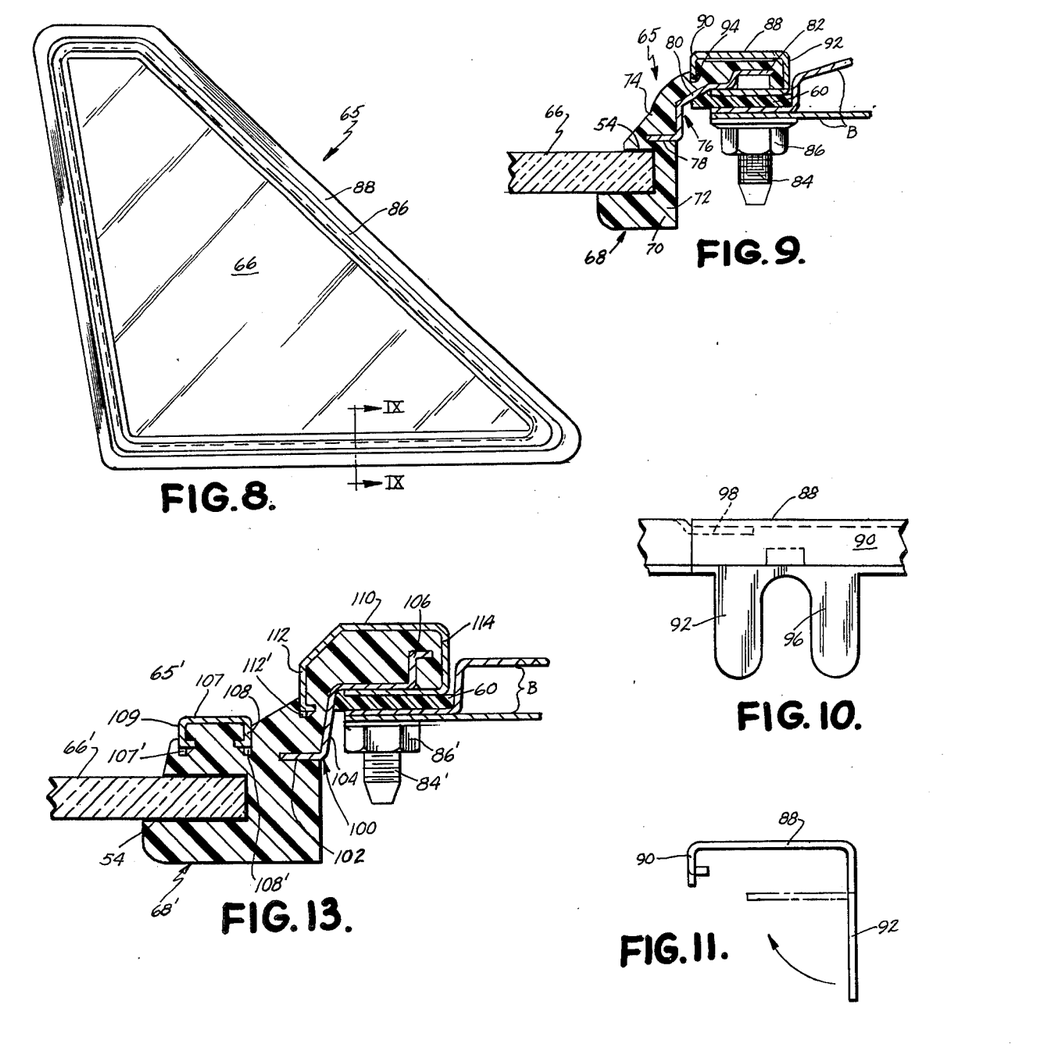
FIG. 8 is an exterior elevation of another embodiment of the window assembly of the present invention.
FIG. 9 is a fragmentary, sectional view taken along plane IX—IX of FIG. 8 illustrating attachment of the window assembly to a vehicular body over an opening therein.
FIG. 10 is a fragmentary, top plan view of the decorative metal strip used in the window assembly shown in FIGS. 8 and 9.
FIG. 11 is an end elevation of the decorative metal strip shown in FIG. 10.
FIG. 13 is a fragmentary, sectional view of a modified version of the window assembly embodiment shown in FIG. 8 including a modified frame and an additional decorative metal strip.
Figure 12:
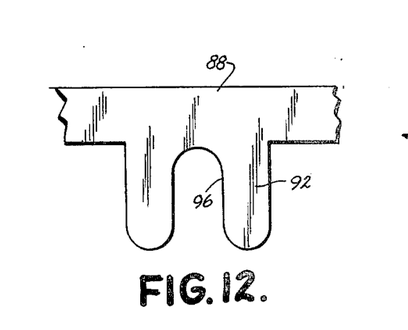
FIG. 12 is a fragmentary, bottom plan view of the decorative metal strip shown in FIGS. 10 and 11.

Referring now to FIGS. 8–12, another embodiment 65 of the window assembly is also intended for permanent installation without opening in a vehicle body opening. This assembly differs from embodiment 10 of the invention in that the window glass 66 provides the major strength and support for the assembly while the casing and attachment portion provide a means for securing the glass to and over the vehicle body opening and for sealing water, dirt and the like out of the vehicle body. Assembly 65 includes a flexible, resilient casing or gasket 68 molded in one piece around the entire periphery of window 66 from polyvinyl chloride or the like. Primer layer 54 is included between casing 65 and window 66 to produce a secure bond. Casing 68 extends around the periphery of the window and includes an inner lip 70, a peripheral portion 72 and an outer portion 74 as shown in FIG. 9. A continuous, rigid frame 76 extends along the entire length of the casing 68 generally on the inside surface thereof such that it is concealed from the view from the exterior or outside of the vehicle body when the assembly is installed. The frame includes a continuous flange 78 embedded within portion 74 of casing 68, a central portion 80 extending along the inside surface of the casing portion 74, and an outer flange 82 embedded in the outer portion of casing portion 74. The embedding of flange 78 and 82 within the casing provides secure retention of the attachment strip or frame 76 to the casing and window.

A plurality of elongated, inwardly extending cylindrical studs 84, welded or otherwise permanently secured to the inside surface of flange 82 and projecting out of the casing toward the inside of the vehicle, provide a means for attachment of the entire assembly to the vehicle. These studs 84 are passed through corresponding apertures in the sheet metal of vehicle body shown at B in FIG. 9 and received grip or lock nuts 86 thereover for secure retention of the assembly. Portions 70 and 74 of the casing extend inwardly toward the window center over the inner and outer surfaces of window 66 to securely hold the periphery of the window adjacent frame flange 78. Flange 78 prevents the casing from flexing in this area and the window from being pushed through and out of the casing and frame.

Although the exterior surface of portion 74 of casing 68 would provide sufficient decoration and trim over the vehicle body opening, additional decorative trim may be added in the form of a metal strip 88 as shown in FIGS. 9–12. Strip 88 is applied after molding of the remainder of the assembly thereby avoiding any marring or scratching of the strip by inclusion in the mold itself. Channel-like strip 88 may be formed from aluminum, chrome-plated steel, stainless steel or the like and includes a first bendable flange 90 at one side and a longer bendable flange 92 in opposition to the first flange. Flange 90 is received in a molded recess 94 provided in the exterior surface of casing portion 74. Strip 88 is placed over the casing with flange 90 in recess 94 as shown in solid in FIG. 11. Flange 92 extends around the peripheral edge of the casing. Thereafter, flanges 90 and 92 are bent at right angles into the recessed 94 and around the rear surface of the casing respectively, to secure the strip in place. Flange 92 includes a recess 96 receiving projection 84 when the flange is bent. The bending of the flanges retains the decorative strip securely in place and provides an additional decorative effect for the entire window assembly around its peripheral edge.

To assemble on the vehicle metal B as shown in FIG. 9, a bead of butyl sealant such as that described at 60 above in connection with embodiment 10 is placed at the end of the body sheet metal on the exterior surface thereof. The assembly is then fitted in place with studs 84 projecting through corresponding openings in the sheet metal such that the butyl sealant is pressed between the inner surface of casing 68 and the body sheet metal B to provide a secure seal against water, dirt, dust and the like. Such a sealant strip is also preferably used when installing assemblies 65′, 120, 120′, 150 and 180 described below. Grip nuts 86 are then placed over studs 84 and assembly of the window to the vehicle is complete. It will be understood that strip 88 can be fashioned continuously from a single sheet of aluminum or other metal and may also be made in segmented strips which are telescoped together as shown in FIG. 10. Each strip may include mating, recessed, end flanges 98 such that they may be telescoped over one another to form the continuous decorative strip extending around the entirety of the window assembly.

Referring now to FIGS. 13–16, a modified version 65′ of window assembly 65 is illustrated. Embodiment 65′ includes a slightly differing rigid frame or attachment member 100 and a more contoured, outer casing surface. Frame or attachment member 100 is continuous and extends around the entirety of the casing 68′ as in embodiment 65 and includes a continuous flange 102 embedded in the casing adjacent or near the periphery of window 66′. Primer layer 54 is included to provide a secure bond between casing 68′ and window 66′. A central portion of the frame 104 extends along the rear or inward surface of the casing 68′ and terminates in an L-shaped flange 106 which extends into and is embedded in casing 68′ adjacent the periphery of the casing. A plurality of spaced attaching studs 84′ are secured by welding or the like to spaced points on the central portion 104 of frame 100. Studs 84′ extend generally perpendicular to the plane of window 66′. Studs 84′ extend out of the casing for attachment of the entire assembly to the body sheet metal B by means of grip nuts 86′ (FIG. 13).

Figure 14:
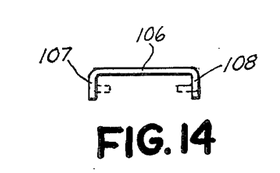
FIG. 14 is an end elevation of one of the decorative metal strips shown in FIG. 13.
Figure 15:
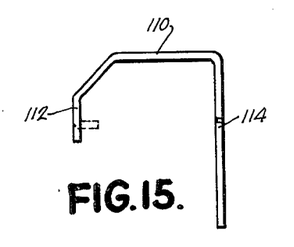
FIG. 15 is an end elevation of the second of the decorative metal strips shown in FIG. 13.
Figures 16, 17, 18:
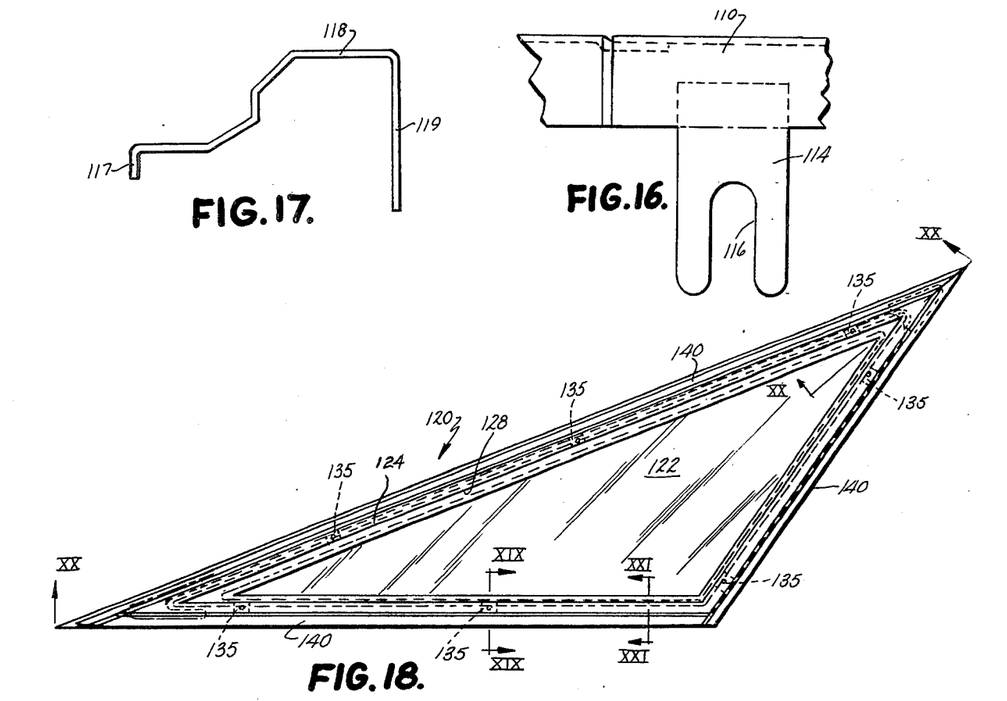
FIG. 16 is a top plan view of the decorative metal strip shown in FIG. 15.
FIG. 17 is an end elevation of a modified decorative metal strip for use as a substitute for the decorative metal strips in the assembly of FIG. 13.
FIG. 18 is an exterior elevation of a third embodiment of the window assembly of the present invention.

In addition, assembly 65′ includes a pair of decorative metal strips 107 and 110 extending around spaced portions of the outer surface of casing 68′. Decorative strip 107 includes flanges 108, 109 which are bent at right angles into recesses 108′ and 107′ for securement of the decorative strip. Strip 110 includes continuous flange 112 and spaced tabs or flanges 114 which are bent into recess 112′ and around the periphery and against the rear surface of casing 68′ respectively (FIG. 13). Flanges 114 include recesses 116 (FIG. 16) for receipt of studs 84′ in the manner described above in connection with assembly 65. These strips are best seen in FIGS. 14–16 and, when the flanges are properly bent, are securely retained on the exterior of the casing for a decorative effect. As with assembly 65, a bead of butyl sealant such as that described at 60 above, may be used between the rear surface of casing 68′ and frame 100 and the exterior surface on the body sheet metal B adjacent the window opening for a secure seal against water and dirt. Strips 107, 110 may be formed continuously from a single piece of sheet metal or in segregated, separate strips telescoped together as described in connection with strip 88 in assembly 65. Alternately, strips 107 and 110 may be formed together in one piece from a single strip of sheet metal as shown at 118 in FIG. 17. In this case, flanges 117, 119 are bent into recess 107′ and around the periphery and against the rear surface of the casing respectively to secure the strip in place. Strip 118, therefore, covers substantially the entire exterior, contoured surface of the casing.

Figure 19:
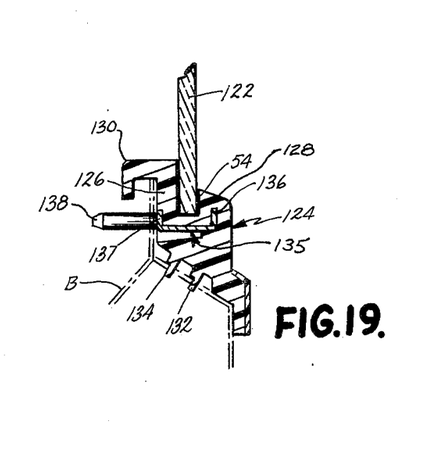
FIG. 19 is a sectional view of the window assembly taken along plane XIX—XIX of FIG. 18.
Figure 20:
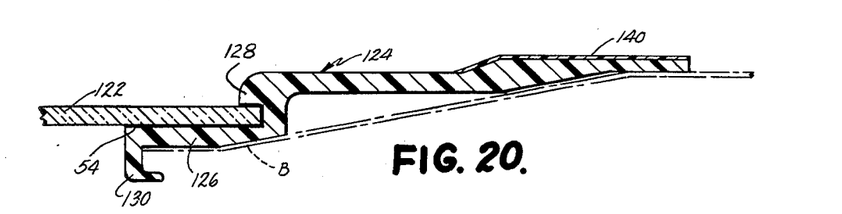
FIG. 20 is a fragmentary, sectional view of the window assembly taken along plane XX—XX of FIG. 18.
Figure 21:
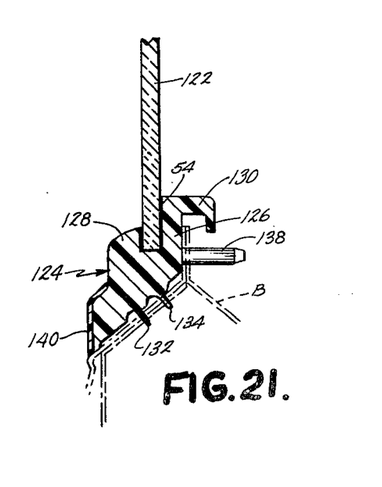
FIG. 21 is a fragmentary, sectional view taken along plane XXI—XXI of FIG. 18.

FIGS. 18–21 illustrate another version 120 of the window assembly including a light-weight combination of elements wherein window 122 provides the primary strength and support for the assembly. Assembly 120 includes a molded, flexible, resilient casing or gasket 124 having a generally stepped outer surface configuration as shown in FIGS. 19–21. At the sharpest corners of the assembly, the stepped configuration is elongated as shown in FIG. 20. Casing 124 extends around the entire peripheral edge of the glass window 122 and includes an inner lip 126 which extends a greater distance inwardly toward the center of the window than does the outer lip 128 for adequate support of the window. Primer layer 54 is included to facilitate the casing-window glass bond. Lip 126 terminates in a generally L-shaped flange 130 molded integrally with the casing 124 from the same tough, flexible, resilient plastic material such as polyvinyl chloride. L-shaped flange 130 extends over the edge of the body sheet metal B as shown in FIGS. 19–21 and provides a locating guide for assembly of inside finishing strips within the vehicle on which the window assembly 120 is secured.

In addition, casing 124 includes a pair of continuous sealing flanges 132, 134 extending inwardly and sealingly engaging the body sheet metal from the interior surface of the casing. These flanges extend around the entire periphery of the casing except for the corners and flex and resiliently and tightly sealingly engage the body sheet metal to prevent leakage into the vehicle around the window and casing. A bead of sealant such as that described above at 60 may be used between casing 124 and sheet metal B for additional sealing.

Figure 23:
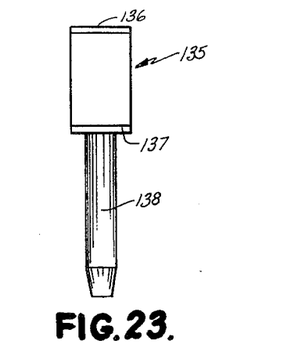
FIG. 23 is an elevational view of one of the attaching members used in the window assembly of FIG. 18.

Assembly 120 differs from assemblies 10, 65 and 65′ described above in that it includes a series of individual, separate attachment members or clips 135 (best seen in FIGS. 19 and 23) which are separately embedded within the casing 124. Clips or attachment members 135 are short, channel-shaped members with a general U-shape in cross-section (FIG. 19). Flanges 136, 137 of the clips extend generally parallel to the outer and inner surfaces of glass window 122 while the base of the U-shaped clip extends parallel to the peripheral edge of the glass. The clip thus "cradles" the periphery of the glass within its channel area. Flanges 136, 137 are firmly embedded in the casing, prevent the casing from pulling away from the window because they extend on either side, and enable attachment of the entire assembly to the vehicle without allowing the window to be pushed out or through the casing. Clips 135 also provide support for the casing and window combination. Each clip includes an elongated attachment stud 138 welded or otherwise secured to flange 137 such that the stud projects inwardly of the assembly generally perpendicular to the window and out from the inner surface of the casing 124 (FIGS. 19 and 21). Studs 138 are received through corresponding apertures in the vehicle body and receive grip nuts for securement of the assembly to the vehicle.

Figure 22:
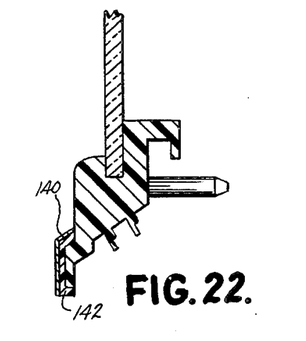
FIG. 22 is a fragmentary, sectional view of a modified version of the window assembly shown in FIG. 18.

Decoration for the exterior surface of casing 124 is provided by bonding a strip of Mylar or other thermoplastic film having thereon a vacuum or otherwise deposited thin, molecular layer of a metallic element such as aluminum, chrome or the like to a portion of the exterior surface of the casing. The metallic-coated Mylar strip 140 is bonded to the casing 124 after molding with a suitable adhesive or included in the mold element when the casing is injection-molded. In the later case, the Mylar is integrally bonded to the polyvinyl chloride during the molding process. A suitable Mylar film coated with a thin, metallic layer found useful in this invention is produced by Glass Laboratories, Inc. of Brooklyn, New York. For better support of the Mylar strip, an additional stiffening layer 142 of plastic material such as semi-rigid polyvinyl chloride to which the Mylar layer 140 is first secured, may be included in the assembly as shown in FIG. 22.

Figure 24:
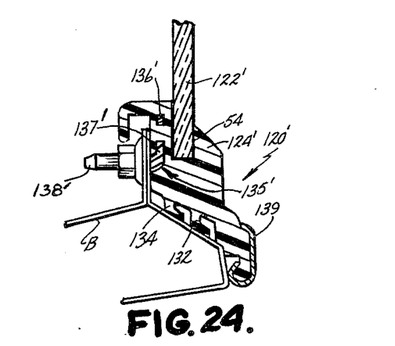
FIG. 24 is a fragmentary, sectional view of a second modified version of the window assembly embodiment shown in FIG. 18.
Figure 25:
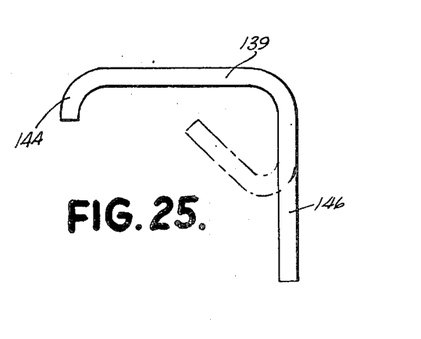
FIG. 25 is an end elevation of the decorative metal strip shown in the window assembly of FIG. 24.

In a modified version 120′ of window assembly 120, shown in FIG. 24, a generally L-shaped attachment member or clip 135′ is used. Clip 135′ includes a securing flange 136′ extending parallel to the interior surface of glass 122′ and entirely embedded within casing 124′ between the interior glass surface and the interior surface of the casing. Flange 136′ includes an aperture 137′ through which the molded casing extends to firmly embed the clip in place. A stud 138′ for attaching the clip and thus, the entire assembly to the vehicle body B, extends inwardly from the inner casing surface and is generally transverse to the plane of the glass 122′ as in the other assemblies mentioned above. In addition, as an alternate to the metallic-coated Mylar strip bonded to the exterior surface of the casing in assembly 120, a metal strip 139 formed from aluminum or the like and having bendable flanges or tabs is secured to the outer peripheral portion of casing 124′ (FIGS. 24 and 25). Strip 139 includes an edge portion 146 corresponding to the curvature of a portion of the stepped contour of the outer surface of casing 124′ as well as a bendable flange 146 which is bent around the outer periphery and against the inside surface of the casing 124′ for securing the strip in place. FIG. 24 also illustrates the flexed position of the sealing flanges 132, 134 included in the assembly.

As shown in FIGS. 26–31, a hinge may also be included in the window assembly to allow the window or a portion of the window to be pivoted between open and closed positions. Hinged window assembly 150 includes a permanently positioned window section 152 fixed in a closed position as well as a hinged window portion 154 which pivots between an open and closed position with respect to the casing. A molded, tough, resilient, flexible, plastic casing 156 formed from polyvinyl chloride or the like, extends along all edges of both window portions 152, 154. However, the peripheral edge of window portion 152 is firmly embedded in casing 156 by lips on the casing which extend inwardly toward the center of window 152 on the inner and outer surfaces thereof in the manner described above in assemblies 65, 65′, 120 and 120′. Primer layer 54 is included to facilitate this permanent bond. Window portion 152 is thus permanently positioned and encased by casing 156 which extends around all four sides of that section.

Figures 26, 28:
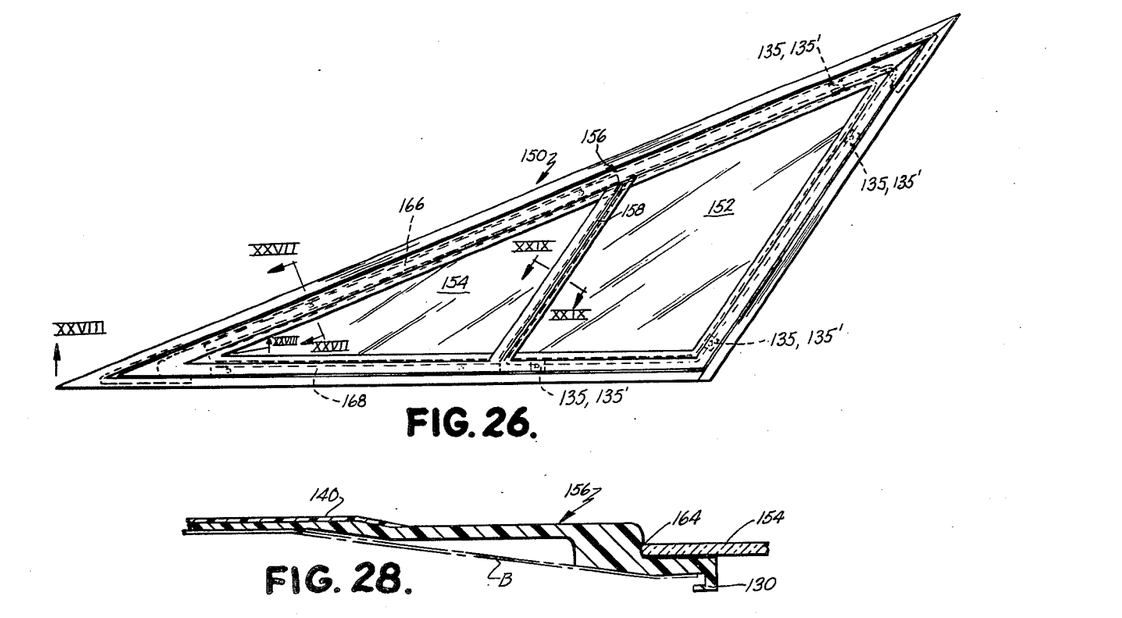
FIG. 26 is an exterior elevation of another embodiment of the window assembly of the present invention including a hinged window portion.
FIG. 28 is a fragmentary, sectional view taken along plane XXVIII—XXVIII of FIG. 26.
Figure 27:
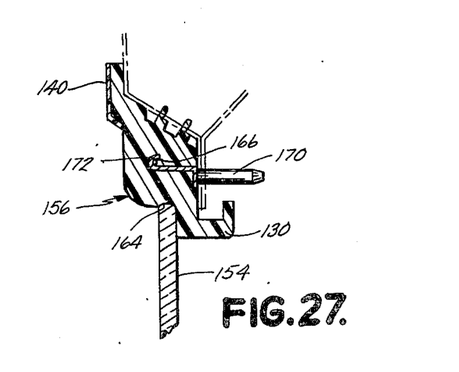
FIG. 27 is a fragmentary, sectional view taken along plane XXVII—XXVII of FIG. 26.
Figure 29:
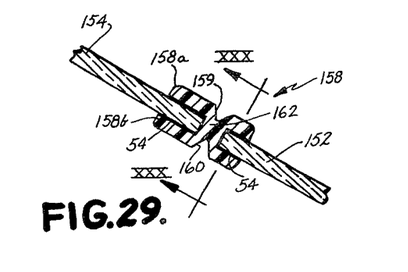
FIG. 29 is a fragmentary, sectional view taken along plane XXIX—XXIX of FIG. 26.
Figure 30:
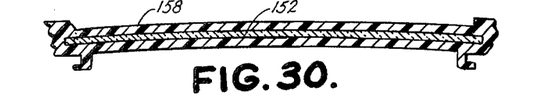
FIG. 30 is a fragmentary, sectional view taken along plane XXX—XXX of FIG. 29.

Hinged window section 154, however, is encased on both inner and outer surfaces along only one edge 158 where the casing extends between opposing edges of the window sections 152, 154. Casing section 158 includes lips or flanges 158a, 158b molded around and bonded to opposite sides of window 154 and opposing, elongated notches 159, 160 on either side thereof forming a recessed central section 162. Central section 162 forms a living hinge of the plastic material of the casing allowing window section 154 to pivot outwardly. The single edge of window section 154 which is permanently secured to casing section 158, is bonded to the casing material during the molding process utilizing a primer layer or coating such as that described at 54 above in connection with assembly 10. The remaining two edges of the triangular-shaped window section 154 tightly engage and sealingly fit against a slight recess 164 in the inner periphery of the casing when the window section is closed (FIGS. 27 and 28). The outer edge of recess 164, protrudes slightly around the edge of the glass in the closed position to hold the glass tightly closed and prevent leakage.

Figures 31, 35:
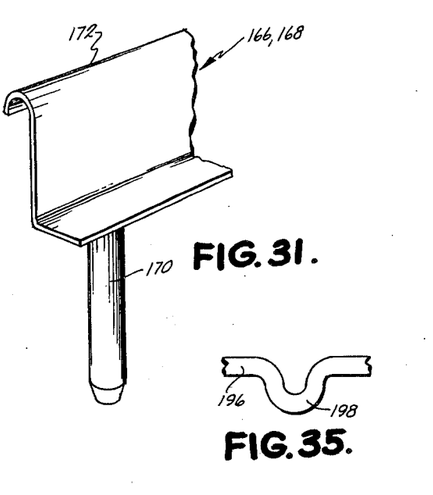
FIG. 31 is a fragmentary, perspective view of the attachment strip used in the window assembly shown in FIGS. 26–30.
FIG. 35 is a fragmentary, lan view of the stiffening rod used in the window assembly shown in FIGS. 32-34.
Figure 32:
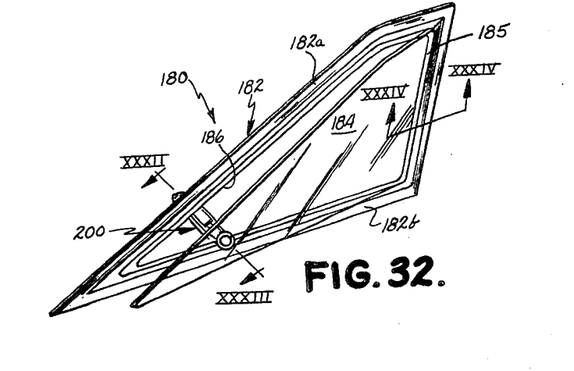
FIG. 32 is a perspective view of a second, hinged version of the window assembly of the present invention.

Since assembly 150 is of the type wherein the window glass itself provides the principle support for the assembly, the opening of window section 154 requires additional support for the casing sections therealong such as elongated, rigid attaching strips 166, 168 (FIGS. 27 and 31). Strips 166, 168 are embedded within the casing and include attaching studs 170 protruding from the casing at spaced locations therealong for securing the entire assembly to the vehicle body. Strips 166, 168 are concealed from view from the exterior of the assembly after installation and extend from adjacent the central casing strip 158 to adjacent the corner or apex of the hinged window section 154 within the casings (See FIG. 26). Strips 166, 168 include curved, hooked continuous flanges 172 extending therealong which are embedded within the casing and retain the strips in the casing when pressure is exerted on the studs to secure the assembly to the vehicle body.

At spaced locations around the permanently positioned window section 152 are separate, individual attachment clips for members such as those described at 135 and 135'. The individual clips are satisfactory around the permanently positioned window inasmuch as the casing does not require as great an amount of support because that window continuously provides such support and does not open. This assembly also includes the interior trim positioning flange 130 molded integrally with the casing on the interior thereof as well as a decorative Mylar strip 140 secured by bonding to the exterior surface of the casing as shown in FIGS. 27 and 28.

Figures 33, 34:
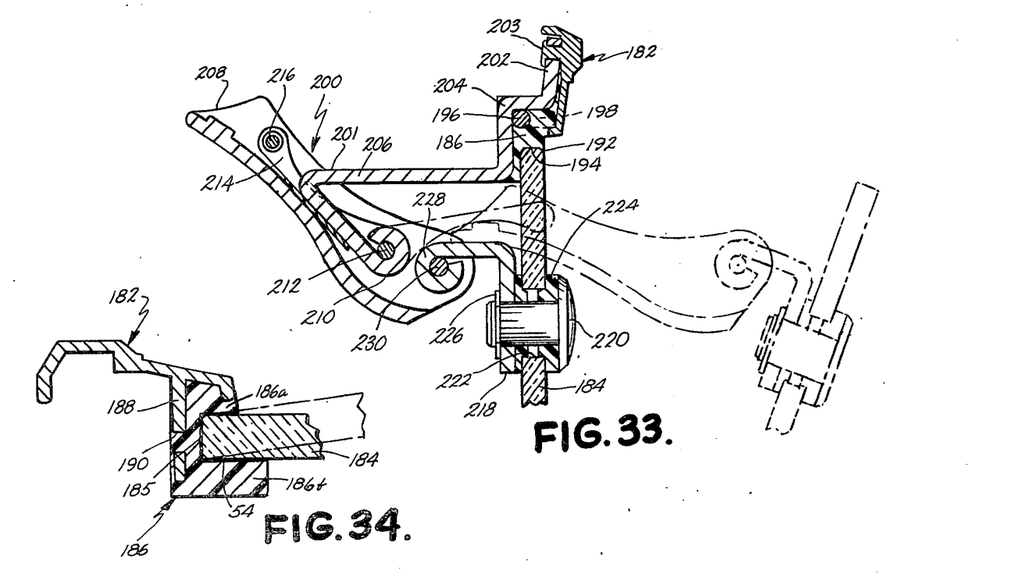
FIG. 33 is a fragmentary, sectional view of the latch apparatus taken along plane XXXIII—XXXIII of FIG. 32.
FIG. 34 is a fragmentary, sectional view taken along plane XXXIV—XXXIV of FIG. 32.

As shown in FIGS. 32-35, a modified version 180 of the hinged window assembly includes a rigid, metallic frame bezel 182 extending around the entire periphery thereof which is similar to frame bezel 12 of assembly 10. A transparent window 184 has a generally vertical edge 185 securely bonded and encased within a casing or gasket 186 which is also secured to and molded around projecting portions 188 of frame bezel 182 in the manner described above in connection with assembly 10. Tabs or retaining projections 188 include apertures 190 filed with casing material during molding and extend into and are embedded within casing 186. Along edge 185, the casing 186 extends inwardly toward the center of the window and forms lips 186a, 186b which are securely bonded with a primer layer such as that at 54 above to the edge of the window. Primer layer 54 is included only along edge 185. Casing lip 186a extends between the exterior window surface and the frame bezel 182 such that it is flush with at least one surface of the frame bezel in the manner described above with assembly 10. The casing may also be bonded and sealed to the frame bezel with sealant 56 or an adhesive applied to the inner surface of the frame bezel as in assembly 10. The casing portion along edge 185 provides a living hinge from the resilient, flexible, plastic material from which the casing is formed which allows the window to be pivoted to its open position (FIG. 34).

The remaining edges of window 184 tightly, sealingly engage the remainder of the casing 186 to prevent water, dirt, dust and the like from leaking through the window opening. As shown in FIG. 33, these window edges have casing portions corresponding to their shape with a small lip 192 and a recess 194 which helps seal the window in its closed position. In portions 182a, 182b of the casing which are left free when the window is pivoted open (FIG. 32), a wire rod stiffener strip 196 (FIGS. 33 and 35) is included for support of the casing when the window is opened. Stiffener strip or rod 196 includes curved, bent, offset portions or protrusions 198 at spaced locations therealong to provide resiliency and stiffness for the rod and further support for the casing. The combination of the frame bezel 182 and stiffener strip 196 therefore prevent the casing from sagging when the window is open.

To open and close the window 184, a pivot latch assembly 200 is included. Latch assembly 200 includes a support bracket 201 having a first flange 202 secured to an integral rivet 203 on the frame bezel, a second portion 204 at least partially embedded within the casing 186 and a third V-shaped portion 206 which is pivotally secured to a lever or handle 208. Bracket portion 206 terminates in a rolled, flange 210 receiving a pivot pin 212 secured in a channel-like pivot lever 214 having its back adjacent the closed side of lever 208. Lever 214 is in turn secured to the channel-shaped handle 208 by pivot pin 216. A second, generally L-shaped bracket 218 is secured to window 184 by means of a bolt 220 extending through aperture 222. A pair of resilient washers 224 are mounted on either side of the aperture 222 to space the head of the bolt 220 and the bracket 218 from the glass. The bolt 220 is secured in place by a split washer 226 as shown in FIG. 33. Bracket 218 which is generally L-shaped has a terminal, rolled flange 228 pivotally secured to the remaining end of channel-shape handle 208 by pivot pin 230. Accordingly, handle 208 projects to the inside of the vehicle and may be grasped and pivoted (downwardly in FIG. 33) to pivot window 184 to its open position such that the handle extends through the window aperture formed by the casing 186. To close the window, handle 208 is returned to its original position (shown in solid in FIG. 33) such that the back of handle 208 sandwiches the back of lever 214 against the exterior surface of portion 206 of bracket 201 preventing the window from opening. Of course, latch assembly 200 is but one of several types of latches which could be used to open and close the pivoted window 184 in assembly 180. Assembly 180 therefore provides a window assembly in which the entire window may be pivoted outwardly and opened. Although assembly 150 discloses an assembly including one fixed and one hinged or pivotable window pane or section, other combinations are within the scope of the invention which might include two or more fixed panes and more than one pivotable pane.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. A vehicular window assembly formed as a complete unit prior to installation and adapted for installation from the exterior of a vehicle body to provide an assembly for closing an opening in a vehicle body, said window assembly comprising a casing constructed of a molded plastic material approximating the shape and size of the opening in a vehicle; a transparent window having a peripheral edge with said casing molded around said peripheral edge; attachment means for attaching said casing and window to said vehicle body, said casing being molded around at least a first portion of said attachment means so as to embed said first portion within the casing; said first portion of said attachment means including a continuous, rigid frame extending along the entire length of said casing and concealed from view from outside the vehicle body, said frame having at least one flange extending therealong which is embedded within said casing, said frame providing strength and support for said casing; said casing having an inner surface arranged to face in a direction toward the inside of the vehicle body and an outer surface arranged to face in a direction toward the outside of said vehicle body; said attachment means having second portions spaced along the casing, extending in a direction toward the inside of said vehicle body, and constituting affixing means for affixing said composite casing and transparent window over said opening in the vehicle body; said casing and attachment means structure providing a finished trim around said window and the periphery of the opening in the vehicle body in which said frame including said second, affixing means, portions are concealed from view outside of the vehicle body.

2. The vehicular window assembly of claim 1 wherein said flange extends along one edge of said frame and terminates within said casing adjacent said window peripheral edge.

3. The vehicular window assembly of claim 2 wherein said frame includes a second flange extending along the edge opposite said one edge, said second flange being at least partially embedded in said casing.

4. The vehicular window assembly of claim 3 wherein said second, affixing means portions of said attaching means include elongated studs extending from said frame inwardly of said casing inner surface, said studs adapted to receive fastening means for fastening said assembly to a vehicle body.

5. The vehicular window assembly of claim 4 wherein said studs extend inwardly from spaced locations along said second flange on said frame.

6. The vehicular window assembly of claim 3 wherein said frame extends along the inside surface of said casing, said flanges projecting into said casing from said inside casing surface.

7. The vehicular window assembly of claim 1 wherein said frame includes a second flange extending along a portion of said frame opposite said one edge, said second flange also being at least partially embedded in said casing.

8. The vehicular window assembly of claim 1 including a decorative strip extending over at least a portion of said outside casing surface.

9. The vehicular window assembly of claim 8 including at least one recess molded in and extending into said outside casing surface; said decorative strip including a metallic strip having at a flange extending into and secured within said recess for holding said strip on said casing.

10. The vehicular window assembly of claim 8 wherein said decorative strip includes a strip of plastic material having a thin layer of metal applied thereon said plastic strip being permanently bonded to said outside casing surface.

11. The vehicular window assembly of claim 8 wherein said decorative strip is a metallic strip having bendable flanges thereon at spaced locations, said bendable flanges adapted to be bent around peripheral edge of said casing and against said inside casing surface whereby said strip is held on said casing.

12. The vehicular window assembly of claim 11 wherein at least one of said bendable flanges includes a recess of sufficient size to receive one of said second, affixing means portions therein when said flange is bent around said casing.

13. A vehicular window assembly formed as a complete unit prior to installation and adapted for installation from the exterior of a vehicle body to provide an assembly for closing an opening in a vehicle body, said window assembly comprising a casing constructed of a molded plastic material approximating the shape and size of the opening in said vehicle; a transparent window having a peripheral edge with said casing molded around said peripheral edge; attachment means for attaching said casing and window to said vehicle body, said casing being molded around at least a first portion of said attachment means so as to embed said first portion within the casing; said first portion of said attachment means including a plurality of separate, rigid, attaching members embedded within said casing at spaced locations along said casing and concealed from view from outside the vehicle body; said casing having an inner surface arranged to face in a direction toward the inside of the vehicle body and an outer surface arranged to face in a direction toward the outside of said vehicle body; said attachment means having second portions spaced along the casing, extending in a direction toward the inside of said vehicle body, and constituting affixing means for affixing said composite casing and transparent window over said opening in the vehicle body; said casing and attachment means structure providing a finished trim around said window and the periphery of the opening in the vehicle body by which said attachment means are concealed from view outside of the vehicle body.

14. The vehicular window assembly of claim 13 wherein said attaching members are each U-shaped and extend around said peripheral edge of said window; said second, affixing means portions including a plurality of elongated stud projections extending out of said casing in a direction toward the inside of the vehicle body, one stud projection extending from each attaching member.

15. The vehicular window assembly of claim 13 wherein said attaching members are generally L-shaped and extend intermediate said window and said inside casing surfaces, said second, affixing means portions including a plurality of elongated stud projections extending out of said casing in a direction toward the inside of the vehicle body, one stud projection extending from each attaching member.

16. The vehicular window assembly of claim 13 wherein said attaching members each include an aperture extending therethrough, said molded plastic material of said casing extending through said apertures and around said attaching members to firmly embed and retain them in said casing.

17. The vehicular window assembly of claim 13 wherein said casing includes at least one flexible, resilient, sealing flange extending along the periphery of said casing and molded integrally with said casing from said plastic casing material for engaging a portion of the vehicle body when said assembly is installed on such a body to seal the opening in the vehicle body.

18. The vehicular window assembly of claim 17 wherein said casing also includes a positioning flange projecting inwardly from and extending along the inside surface of said casing such that it extends over the edge of said vehicle body portion forming said opening, said positioning flange being molded integrally with said casing from said plastic casing material and providing a guide for securing materials on the interior of said vehicle body.

19. The vehicular window assembly of claim 13 including a decorative strip extending over at least a portion of said outside casing surface.

20. The vehicular window assembly of claim 19 wherein said decorative strip includes a strip of plastic material having a thin layer of metal applied thereon, said plastic strip being permanently bonded to said outside casing surface.

21. The vehicular window assembly of claim 19 wherein said decorative strip is a metallic strip having bendable flanges thereon at spaced locations, said bendable flanges adapted to be bent around the peripheral edge of said casing and against said inside casing surface whereby said strip is held on said casing.

22. A vehicular window assembly formed as a complete unit prior to installation and adapted for installation from the exterior of a vehicle body to provide an assembly for closing an opening in a vehicle body, said window assembly comprising a casing constructed of a molded plastic material approximating the shape and size of the opening in said vehicle; a transparent window having a peripheral edge with said casing molded around and secured to only one portion of said peripheral edge; said casing which is molded around said one portion of said peripheral edge forming a flexible, resilient hinge allowing said window to be pivoted away from said casing between closed and open positions, said casing having second portions which tightly, sealingly engage the remainder of said peripheral window edge when said window is closed; attachment means for attaching said casing to said vehicle body, said casing being molded around at least a first portion of said attachment means so as to embed said first portion within the casing; said casing having an inner surface arranged to face in a direction toward the inside of the vehicle body and an outer surface arranged to face in a direction toward the outside of said vehicle body; said attachment means having second portions spaced along the casing, extending in a direction toward the inside of said vehicle body, and constituting affixing means for affixing said composite casing and transparent window over said opening in the vehicle body; said casing and attachment means structure providing a finished trim around said window and the periphery of the opening in the vehicle body by which at least said second, affixing portions of said attachment means are concealed from view outside of the vehicle body.

23. The vehicular window assembly of claim 22 wherein said attachment means include at least one elongated, rigid attaching strip embedded within said casing along said second casing portions and concealed from view from outside the vehicle body, said strip providing support for said casing when said window is opened and moved away from said remainder of said casing.

24. The vehicular window assembly of claim 23 wherein said second, affixing portions of said attaching means include elongated studs extending from said attaching strip inwardly of said casing inner surface, said studs adapted to receive fastening means for fastening said assembly to a vehicle body.

25. The vehicular window assembly of claim 24 wherein said attaching strip includes a hook-shaped flange extending along an edge thereof and embedded in said casing to help retain said strip within said casing.

26. The vehicular window assembly of claim 22 including a decorative strip extending over at least a portion of said outside casing surface.

27. The vehicular window assembly of claim 22 including latch means secured between said window and said casing for holding said window in an open or closed position as desired.

28. The vehicular window assembly of claim 22 including a second transparent window having a peripheral edge with portions of said casing molded around the entirety thereof and retaining said second window in a permanently closed position with respect to said casing.

29. The vehicular window assembly of claim 28 wherein said one casing portion extends between opposing edges of the first of said transparent windows and said second window.

30. The vehicular window assembly of claim 28 wherein said attachment means include at least one elongated, rigid attaching strip embedded within said casing along said second casing portions and concealed from view from outside the vehicle body, said strip providing support for said casing when said window is opened and moved away from said remainder of said casing; said attachment means also including a plurality of rigid, separate attaching members embedded within said casing at spaced locations along the portions of said casing which are molded around said second window, said separate attaching members also being concealed from view from outside the vehicle body; said second, affixing portions of said attaching means including elongated studs extending from said attaching strip and each of said attaching members inwardly of said casing inner surface, said studs adapted to receive fastening means for fastening said assembly to a vehicle body.

31. The vehicular window assembly of claim 22 wherein said attachment means includes a rigid, frame bezel extending along said outside of said casing, said casing extending between said frame bezel and said window; said frame including at least one projection extending inwardly of said casing in a direction toward the inside of the vehicle body, said casing encompassing said projection for retention of said frame bezel and casing together.

32. The vehicular window assembly of claim 31 including a stiffening strip extending through and along at least a portion of said casing and embedded within said casing at a position spaced from said frame bezel.

33. The vehicular window assembly of claim 32 wherein said stiffening strip is an elongated rod including bent portions at spaced locations therealong to enhance the stiffness and resiliency of said rod.

34. The vehicular window assembly of claim 22 wherein said second portions of said casing include a recess extending therealong for receiving and sealingly engaging the peripheral edge of the remainder of said window when said window is closed.

* * * * *

UNITED STATES PATENT AND TRADEMARK OFFICE
CERTIFICATE OF CORRECTION

PATENT NO. : 4,139,234
DATED : February 13, 1979
INVENTOR(S) : Cleon C. Morgan

It is certified that error appears in the above—identified patent and that said Letters Patent are hereby corrected as shown below:

Column 5, line 51:
"lan" should be -- plan --

Column 6, line 43:
"and" should be -- are --

Signed and Sealed this

Tenth Day of July 1979

[SEAL]

Attest:

LUTRELLE F. PARKER

Attesting Officer        Acting Commissioner of Patents and Trademarks